United States Patent
Sirisilla et al.

(10) Patent No.: US 10,332,067 B2
(45) Date of Patent: Jun. 25, 2019

(54) METHOD AND SYSTEM FOR AUTOMATIC REPLENISHMENT AND MANAGEMENT OF INVENTORY

(71) Applicant: Tata Consultancy Services Limited, Mumbai (IN)

(72) Inventors: Nataraj Sirisilla, Hyderabad (IN); Sowmya Togarcheti, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 248 days.

(21) Appl. No.: 15/065,676

(22) Filed: Mar. 9, 2016

(65) Prior Publication Data
US 2017/0206489 A1    Jul. 20, 2017

(30) Foreign Application Priority Data
Jan. 18, 2016    (IN) .............................. 201621001689

(51) Int. Cl.
*G06Q 10/08*    (2012.01)
*H04L 29/08*    (2006.01)
*G06Q 30/06*    (2012.01)

(52) U.S. Cl.
CPC ....... *G06Q 10/087* (2013.01); *G06Q 30/0611* (2013.01); *G06Q 30/0633* (2013.01); *G06Q 30/0639* (2013.01); *H04L 67/10* (2013.01)

(58) Field of Classification Search
CPC .. G06Q 10/07; G06Q 10/087; G06Q 30/0631; G06Q 30/0633; G06Q 10/00;
(Continued)

(56) References Cited

U.S. PATENT DOCUMENTS 6,204,763 B1 *  3/2001  Sone .................... A47G 29/141
                                                              221/2
6,341,271 B1    1/2002  Salvo et al.
(Continued)

OTHER PUBLICATIONS

Felice De Toni, A. et al. (Apr. 2005). "From a traditional replenishment system to vendor-managed inventory: A case study from the household electrical appliances sector," *International Journal of Production Economics*, 96(1): 63-79.

*Primary Examiner* — Olusegun Goyea
(74) *Attorney, Agent, or Firm* — Finnegan, Henderson, Farabow, Garrett & Dunner LLP (57) ABSTRACT

The present disclosure discloses a system and method for automatic replenishment and management of inventory determines residual level of one or more household commodities, provides information concerning the residual level of one or more household commodities to various vendors, and a users' electronic device application using which the user can decide to place an order. The system includes plurality of sensor enabled commodity containers for inventory, communication boxes for receiving and further reporting current residual level of the one or more household commodities and a host server for integrating the received residual level information with one or more unique identifiers. Further, the host server provides the integrated information list to third parties without having any manual involvement in the whole process. Therefore, the host server may receive customized offer information concerning the integrated information list of one or more household commodities from the third parties which is then passed on to the users. An order to be placed directly with the third parties by the user.

11 Claims, 4 Drawing Sheets

(58) Field of Classification Search
CPC ........ G06Q 10/10; G06Q 30/06; G06Q 20/20;
G06Q 30/02; H04L 67/10
USPC ................ 705/26.8, 21, 7.25, 28, 305, 7.41
See application file for complete search history.

(56) References Cited

U.S. PATENT DOCUMENTS

| | | | | |
|---|---|---|---|---|
| 6,985,877 | B1* | 1/2006 | Hayward | G06Q 10/06395 |
| | | | | 705/7.41 |
| 7,013,092 | B2* | 3/2006 | Hayward | G06Q 30/02 |
| | | | | 399/24 |
| 7,711,603 | B2 | 5/2010 | Vanker et al. | |
| 8,126,784 | B1* | 2/2012 | Agarwal | G06Q 10/00 |
| | | | | 705/22 |
| 2001/0053980 | A1* | 12/2001 | Suliman, Jr. | G06Q 30/012 |
| | | | | 705/26.1 |
| 2002/0161652 | A1* | 10/2002 | Paullin | B65D 79/00 |
| | | | | 705/22 |
| 2003/0004784 | A1* | 1/2003 | Li | G06Q 10/087 |
| | | | | 705/28 |
| 2004/0195309 | A1* | 10/2004 | Wagner | B07C 7/005 |
| | | | | 235/375 |
| 2005/0075954 | A1 | 4/2005 | Matsumoto et al. | |
| 2012/0016764 | A1* | 1/2012 | Ouimet | G06Q 30/0631 |
| | | | | 705/26.7 |
| 2013/0208320 | A1* | 8/2013 | Suzuki | B41J 2/17546 |
| | | | | 358/1.16 |
| 2013/0218511 | A1* | 8/2013 | Mager | G01G 23/3735 |
| | | | | 702/129 |
| 2013/0234852 | A1 | 9/2013 | Sena et al. | |
| 2014/0304026 | A1* | 10/2014 | Delaney | G06Q 30/0633 |
| | | | | 705/7.25 |
| 2015/0127421 | A1* | 5/2015 | Nakano | G06Q 30/0201 |
| | | | | 705/7.29 |
| 2015/0127477 | A1* | 5/2015 | Urquhart | G06Q 20/10 |
| | | | | 705/21 |
| 2015/0363866 | A1* | 12/2015 | Depew | G06Q 30/0633 |
| | | | | 705/26.8 |
| 2016/0292632 | A1* | 10/2016 | Mashburn | G06Q 10/1097 |
| 2016/0314518 | A1* | 10/2016 | Goodwin | G06Q 30/0637 |
| 2017/0046773 | A1* | 2/2017 | Hendricks, II | G06Q 30/0635 |

* cited by examiner

METHOD AND SYSTEM FOR AUTOMATIC REPLENISHMENT AND MANAGEMENT OF INVENTORY

PRIORITY CLAIM

This U.S. patent application claims priority under 35 U.S.C. § 119 to India Application No. 201621001689, filed on Jan. 18, 2016. The entire contents of the aforementioned application are incorporated herein by reference.

TECHNICAL FIELD

This disclosure relates generally to a replenishment and management of an inventory via Internet of Things, particularly a residual level household commodity ordering management without manual interference and purchasing directly from various vendors by the consumer over the internet.

BACKGROUND

With the advent of technology, especially in area of Internet of things (herein after referred as "IoT"), staying connected can be taken to the next level of not only users, but also the relevant entities around users can be connected by auto sharing of information in a controlled manner. This next level of connectivity along with reimagining the way typical businesses are carried out today, will not only help in operating and optimizing the entire chain in terms of efficiency and cost, but also importantly creating a novel and compelling experience.

In recent years, the popularity of computers and the internet has been widely introduced into peoples' daily work. In addition, the sensor network where a network is formed of various sensors to make communication among the sensors and between the sensors and with RFIDs, and the sensing information is obtained in the base stations for making communication with such sensors and RFIDs and is then transmitted to a server in order to execute various processes. In the method of using the Internet, inspection and acquisition of product information on the WEB, and ordering and purchasing of product through the mail-order selling system are now the daily events. Moreover, the personal computers and peripheral apparatuses in the households and offices are often used through the communication which has been realized by connection thereof with the radio LAN.

However, at present in the inventory management, particularly in the household consumable commodity replenishment management, most of work still remains in the manual ways. It requires a lot of manpower and money engaged in the management. In addition to, the results are not satisfactory, not only low efficiency of management as well as prone to errors and other issues.

There exists a spectrum of methodologies by which inventory is managed only within the particular storing boxes such as refrigerator and cupboards. There are structures for inventory management and ordering of product provided with RFIDs and sensors.

OBJECTIVE OF THE INVENTION

In accordance with the present invention, the primary objective is to provide a system and a method for determining the residual level of household commodities in sensor enabled commodity containers (hereinafter read as SENCOs).

Another objective of the invention is to provide a system and a method for transmitting residual level information from SENCOs to the one or more third parties via the RetEx 2.0 Hub.

Another objective of the invention is to provide a system and a method for transmitting relevant product information from the one or more third parties to the users via RetEx 2.0 Hub.

Another objective of the invention is to provide a system and a method for placing order directly with one or more third parties in accordance to the customized offer information received from them.

SENCO—Sensor Enabled Commodity Container (SENCO) is a container to hold commodities is placed within an establishment. Each SENCO is embedded with at least one sensor to determine the level of commodity within the SENCO.

RetEx 2.0 Hub—A RetEx 2.0 Hub is a server (herein after referred as the Host Server) connects consumers with retailers in near real time. It is based on a RetEx 2.0. The RetEx 2.0 presents the possibility of connecting the retail commodities to the consumers, retailers and other possible stakeholders in the entire value chain. In the RetEx 2.0 a consumer can buy the household commodities from various retailers by comparing the offers in the near real-time. The consumer can place an order as and when the demand arises. Retailers also has near real-time visibility into demands and requirements of a specific consumer in specific geography in the RetEx 2.0. The retailers can analyze the consumer-specific data and draw up timely and customized offers. The RetEx 2.0 Hub receives information from various communication boxes as input and then stores it in a table. The received information is further processed and shared on request from the retailers or any other interested third parties who have subscribed to the RetEx 2.0 Hub service. The RetEx 2.0 Hub brokers timely, realistic and specific information between consumers and retailers which is the key to the idea of next level of retail experience.

SUMMARY

Embodiments of the present disclosure present technological improvements as solutions to one or more of the above-mentioned technical problems recognized by the inventors in conventional systems. For example, in one embodiment, a system for automatic replenishment and management of inventory, wherein the system includes a plurality of containers placed within premises or establishments. The sensors attached with containers determine the residual level of the one or more household commodities and share the received information with a one or more communication boxes. Further, the system includes a one or more communication boxes to receive and aggregate the information of the residual level of the one or more household commodities. Furthermore, the system includes a host server to receive the aggregated information from the one or more communication boxes and integrate the received information with one or more unique identifiers. Furthermore, the host server aggregates and enhances the integrated information of the residual level of the one or more household commodities with user's location details and shares with the one or more third parties which have subscribed to the services of host server. In addition to, the system includes users' electronic devices to receive the customized offer information prepared and shared by the one or more third parties via the host server and to place an order as per the customized offer information.

In another embodiment, a computer implemented method for automatic replenishment and management of an inventory wherein the method includes determining the residual level of the one or more household commodities in the plurality of containers and sharing this information with the respective communication box of the one or more communication boxes. Further, the one or more communication boxes aggregates the received information and shares with the host server of the system. Therefore, the host server integrates the received information from the one or more communication boxes with one or more unique identifiers and further enhances the integrated information of the residual level of the one or more household commodities with user's location details. In addition to, the host server shares the integrated and enhanced list of residual level of household items information with the one or more third parties which have subscribed to the services of the host server. The one or more third parties prepare customized offer information in accordance to the received list of residual level of one or more household commodities information. Further, the one or more third parties share the customized offer information with the user on the users' electronic device via the host server over the internet. The user can place order directly with the one or more third parties as per the customized offer information shared by the one or more third parties, In yet another embodiment, a computer readable medium storing instructions for executing a method performed by a computer processor, the method following the steps of determining the residual level of the one or more household commodities in the plurality of containers and sharing this information with the respective communication box of the one or more communication boxes. Further, the one or more communication boxes aggregates the received information and shares with the host server of the system. Therefore, the host server integrates the received information from the one or more communication boxes with one or more unique identifiers and further enhances the integrated information of the residual level of the one or more household commodities with user's location details. In addition to, the host server shares the integrated and enhanced list of residual level of household items information with the one or more third parties which have subscribed to the services of the host server. The one or more third parties prepare customized offer information in accordance to the received list of residual level of one or more household commodities information. Further, the one or more third parties share the customized offer information with the user on the users' electronic device via the host server over the internet. The user can place order directly with the one or more third parties as per the customized offer information shared by the one or more third parties.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to systems and methods for automatic replenishment and management of inventory. In one aspect, the invention is to determine the residual level of one or more household commodities within a plurality of containers, to receive the residual level information at a communication box, to integrate the received information with one or more unique identifiers by the host server and to receive the customized offer information by the user based on the information shared by the host server. Further, the user can place an order with the one or more third parties as per the customized offer information received from the one or more third parties on their electronic device via the host server.

Figure 1:
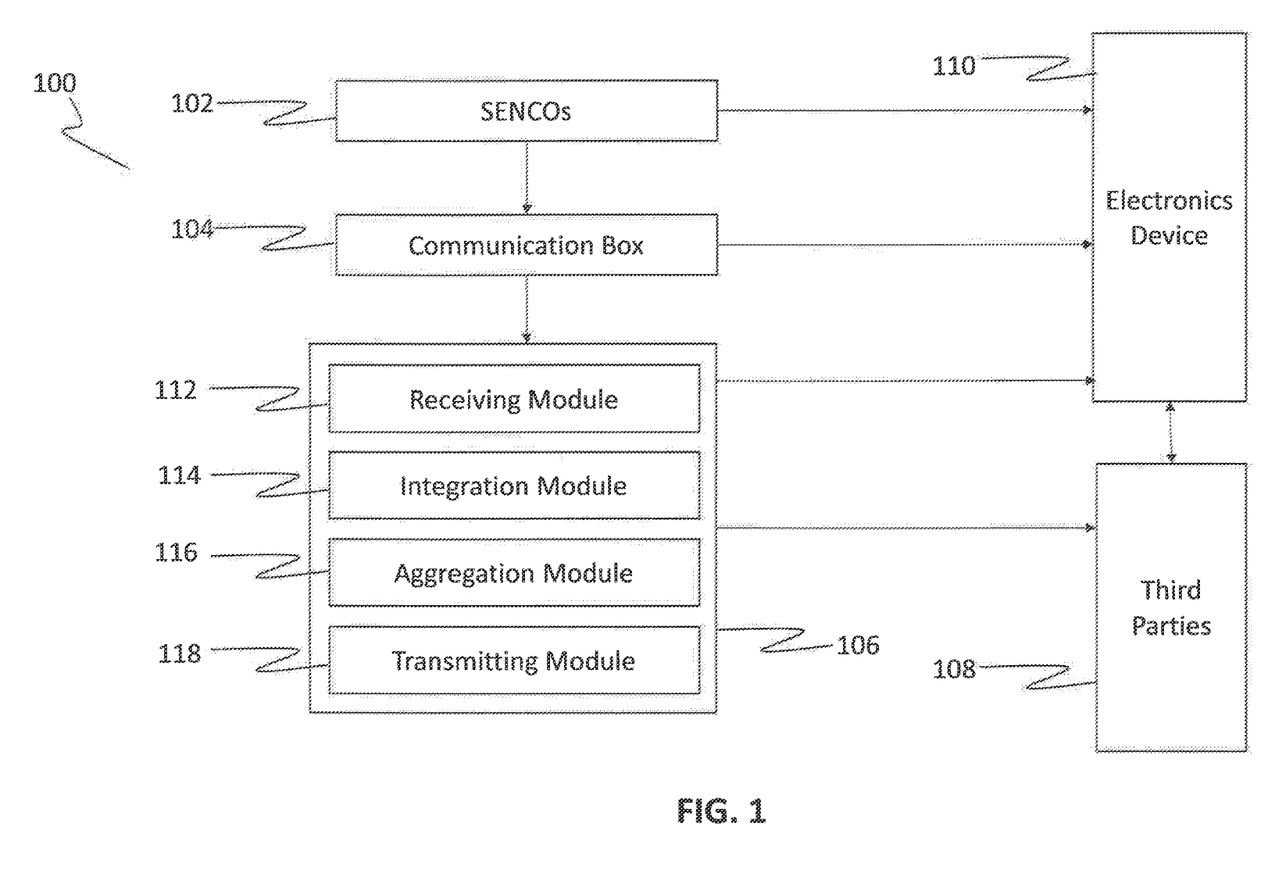
FIG. 1 illustrates an exemplary network implementation of a system for collecting information of the residual level of household commodity from the plurality of containers at the host server.
Figure 2:
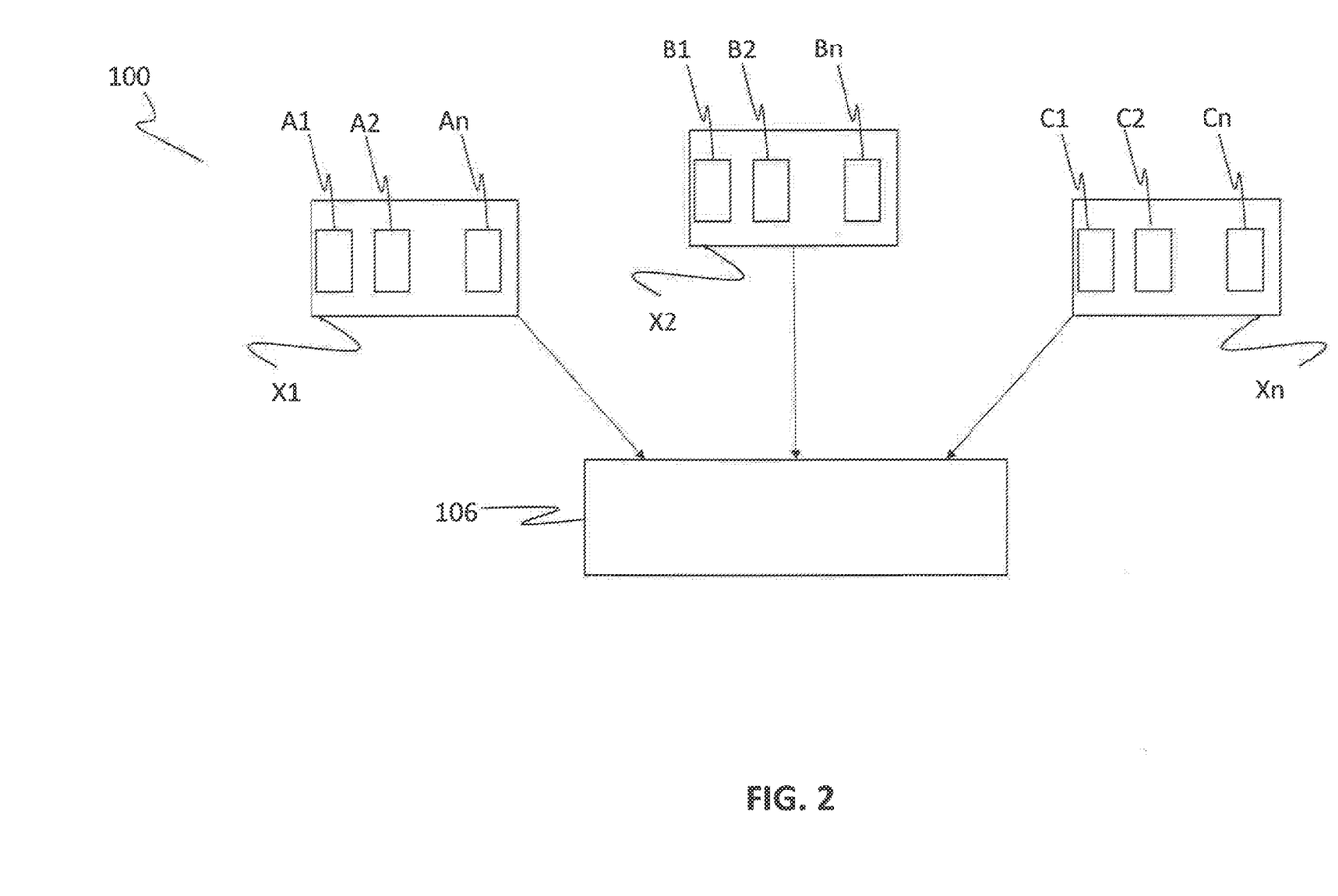
FIG. 2 illustrates the system for automatic replenishment and management inventory.

Referring now to FIG. 1, a network implementation of a system 100 for maintaining an inventory of one or more household commodities is shown in block diagram of FIG. 1. The system (100) determines and collects information of the residual level of the one or more household commodities from plurality of containers (102) also known as SENCOs of the system (100) placed within an establishment at the one or more communication boxes (104) mounted at the respective establishments. The received information at the one or more communication boxes (104) is aggregated and transmitted further to the host server (106) also known as RetEx 2.0 Hub of the system (100). The information received at the host server (106) of the system (100) is integrated with one or more unique identifiers and is further transmitted to the one or more third parties (108) without having any manual interference. The system (100) receives customized offers from the one or more third parties (108), with respect to each identifiable user, in relation to the required one or more household commodities. Further, the system (100) shares the received offers from the one or more third parties (108) with already identified individuals on their electronic devices (110). The individual can place order in respect to his choice with the respective one or more third parties (108). The system can also be referred as a residual level of the one or more household commodities order and purchase management system.

In the preferred embodiment, the system (100) comprises a plurality of sensor enabled commodity containers (SEN- COs) also referred as containers (102), a one or more communication boxes (104), and a RetEx 2.0 Hub (106) also referred as a host server as shown in FIG. 1. The plurality of containers (102) are placed within an establishment to store the one or more household commodities.

The plurality of containers (102) are having at least one sensor for determining the residual level of the one or more household commodities in the respective containers. The plurality of containers (102) are in connection with the users' electronic device (110). The plurality of containers (102) transmits the information of the residual level of the one or more household commodities to one of the one or more communication boxes (104). A (A1, A2, . . . An) number of containers of the plurality of containers (102) (A1, A2 . . . An; B1, B2, . . . Bn; C1, C2, . . . ), placed within the establishments, are in synched with at least one communication box (X1, X2, . . . Xn) of the one or more communication boxes (104) (X1 X2, . . . Xn) in a manner that each container of the plurality of containers (102) have their unique identified communication box.

Each communication box X1, X2, . . . Xn) of the one or more communication boxes (104) receives the information of the residual level of the one or more household commodities from their respective number of containers (A1, A2, . . . An . . . B1, B2, . . . Bn, . . . C1, C2, . . . Cn) placed within the establishment. The identified communication box (X1, X2, . . . Xn) of the one or more communication boxes (104) aggregates the received information from the plurality of containers (102). The one or more communication boxes (104) transmits the aggregated information to the host server (106) over the internet.

Further, according to another embodiment of the invention, the host server (106) comprises receiving module (112), aggregation module (114), integration module (116), and transmitting module (118) as shown in FIG. 1. The receiving module (112) receives aggregated information from the one or more communication boxes (104).

In another embodiment of the invention, the integration module (116) of the host server (106) integrates the received information from the one or more communication boxes (104) with at least one unique identification from one or more unique identifiers such as unique communication box identification, unique premises identification and unique users' electronic device identification but not limited to the given one or more unique identifiers it can include others too for unique identification. The one or more unique identifiers may use to identify each container of the plurality of containers (102).

In other embodiment of the invention, the aggregating module (114) of the host server (106) aggregates and enhances the integrated information of the residual level of the one or more household commodities with user's location details and prepares an information list based on the received information.

According to an embodiment of the invention, the transmitting module (118) of the host server (106) transmits the aggregated and enhanced information of the residual level of the one or more household commodities with user's location details to the one or more third parties (108). The one or more third parties (108) include retail vendors, advertising agencies and any other stakeholder who are interested in the information. Therefore, at least one third party from the one or more third parties (108) designs a customized offer information according to the received aggregated information list from the transmitting module (118 the host server (106), Furthermore, the one or more third parties (108) share the customized offer information with the user on the users' electronic devices (110) via the host server (106) over the internet. The users may place order for the one or more household commodities from received customized offer information from the one or more third parties (108), In the preferred embodiment, there are the plurality of containers (102) within the establishment. Each SENCO of the plurality of containers (102) has at least one embedded sensor. These embedded sensors are designed to read the residual quantity of the one or more household commodities in the plurality of containers (102). Further, the embedded sensors of the plurality of containers may share the information of the residual level of the one or more household commodities with an identified communication box (X1, X2, . . . Xn) from the one or more communication boxes (104) with which they are registered.

In the preferred embodiment, the one or more communication boxes (104) are configured to receive information of the residual level of the one or more household commodities from the plurality of containers (102). Further, the identified communication box (X1, X2, . . . Xn) of the one or more communication boxes (104) must be within the range of the plurality of containers (102). The identified communication box (X1, X2, . . . Xn) of the one or more communication boxes (104) mounted at the establishment is registered with a number of containers (A1, A2, . . . An; or B1, B2, . . . Bn or C1, C2, . . . Cn) of plurality of containers (102) placed within the establishment to receive the information of the residual level of the one or more household commodities. The establishment includes, but not limited to, a house, a household, a business complex and a warehouse.

A preferred embodiment, a RetEx 2.0 Hub works as a host server (106) of the system (100). The host server (106) connects users through users' electronic device (110) with the one or more third parties (108) in near real time. The host server (106) receives aggregated information of the residual level of the one or more household commodities from the one or more communication boxes (104). The host server (106) integrates the received information with at least one unique identifier from one or more identifiers. The one or more unique identifiers may be used for identifying the plurality of containers (102). Further, the host server (106) aggregates and enhances the integrated information of the residual level of the one or more household commodities with user's location details and prepares a relevant information list of the residual level of the one or more household commodities. The host server (106) shares the integrated information with the one or more third parties (108) that already registered or have subscribed to its services, over the internet. Therefore, the host server (106) receives the customized offer information from the one or more third parties (108) over the internet.

In the preferred embodiment, the one or more third parties (108) includes, but not limited to, the vendors, the advertising agencies and other stakeholders who are interested in the retail business. The one or more third parties (108) must be registered or subscribed with the host server (106). This registration or subscription will result in a unique identification for the one or more third parties (108) with the help of which the one or more third parties' server can be connected to the host server (106) periodically. The host server services may require a separate agreement between the host server (106) and the one or more third parties (108). The host server (106) shares the integrated information of the one or more household commodities with the one or more third parties (108) over the internet. The third party prepares customized offers according to individual's needs and demands. Further, the one or more third parties (108) share the customized offer information with users on the users' electronic device (110) via the host server (106) over the internet. The users can directly place the order with the one or more third parties (108) according to the received customized offer information.

In the preferred embodiment, the advertising agencies, who are registered with the host server (106), will act as a communication channel between the host server (106) and other vendors who are in retail business but not registered with the host server (106). The advertising agencies support surrogate advertising by pushing relevant promotions that are currently available with retailers who are not registered with the host server (106).

In the preferred embodiment, the users' electronic device (110) includes, but not limited to, a mobile device, a computer, an I-pod and others where the user can download an application. The application may be downloaded from the users' electronic device (110) application stores, which may be free-of-cost or in-purchase. The application will be registered using the users' name and other unique identifiers e.g. the device unique identification and users' house address. The application of the users' electronic device (110) provides an interface for the users to connect with the plurality of containers (102), the one or more communication boxes (104), the host server (106) and the one or more third parties (108). The application displays a dashboard to the user which consists of various commodities, displaying their quantity levels, offers against them from the plurality of one or more third parties (108), and also an option to place the order. On selecting the offer, the user may click to place an order with the specific vendor. The dashboard may also have an option to share the availed the customized offer information on the relevant social media of the user. This may increase the credibility of the availed the customized offer information in the users' social circle thereby increasing the sales for the vendor.

The application of the users' electronic device (110) may have a sensor configurator on display to deal with one-time configuration of the plurality of containers (102) and the one or more communication boxes (104). The sensor configurator includes the unique identification of the plurality of containers (102) and the one or more communication boxes (104).

The present invention can be explained with the help of the following working example. An establishment (E) has ten (10) SENCOs for one or more household commodities. A communication box (CB) which is very similar to a TV set top box will be mounted on the establishment (E). The SENCOs send the residual level information to communication box (CB) with which the SENCOs are registered. The communication box (CB) aggregates and transmits the aggregated information of the SENCOs to a host server (H). The aggregated information will have information of residual level commodity information, communication box (CB) unique identification, establishment unique identification, user mobile number and so on. The host server (H) will receive such information from multiple communication boxes. Therefore, the host server will integrate the received information with one or more unique identifiers as mentioned above. Further, the host server (H) will aggregate the integrated information and prepare a list of relevant information. Therefore, the host server (H) will share the list of commodities with already registered third parties i.e. vendors and advertising agencies. These third parties prepare their customized offers information and shared with the users on their electronic devices via the host server (H). The user will have choice to place order with one or multiple vendors in near real time.

Figure 3A:
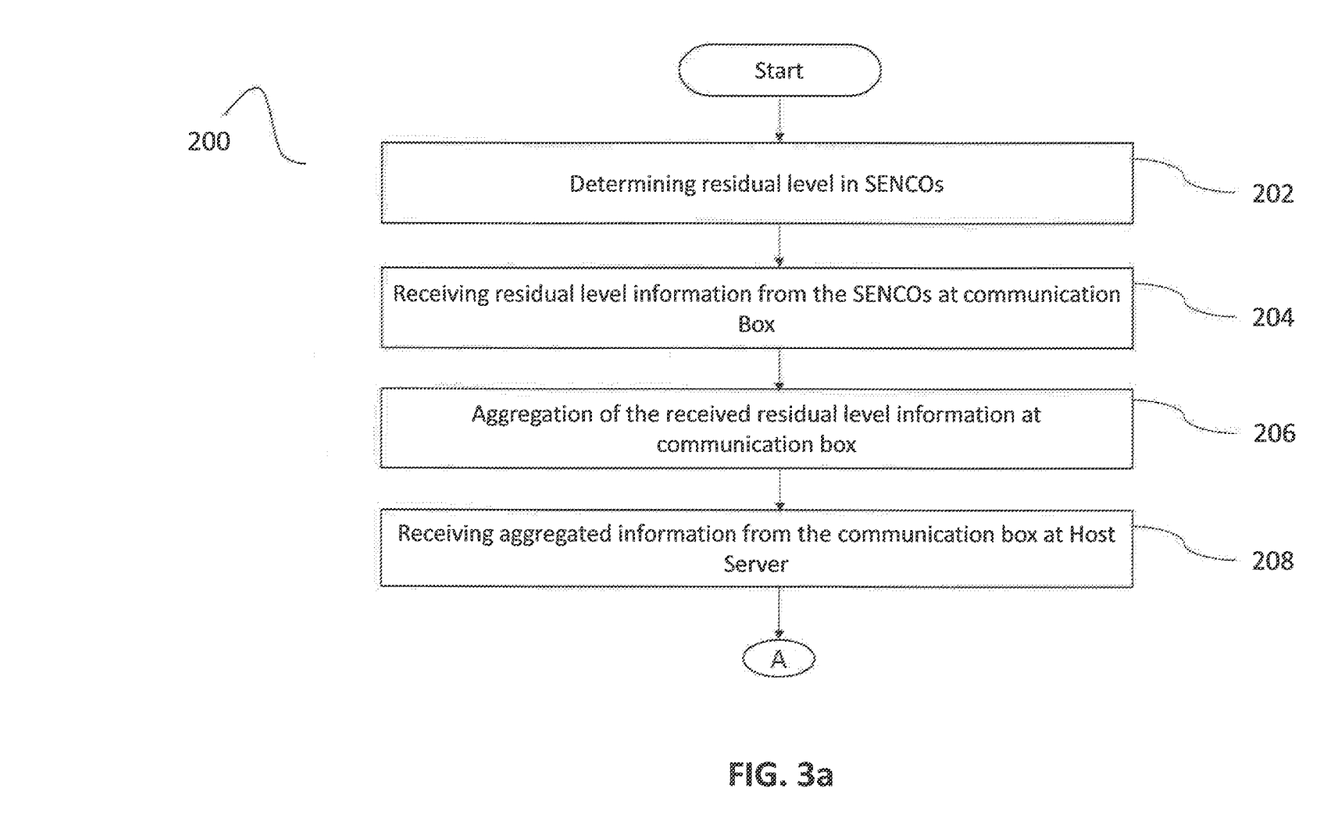
FIGS. 3a and 3b illustrates a block diagram, showing a method for automatic replenishment and management of inventory according to an embodiment of the present disclosure.
Figure 3B:
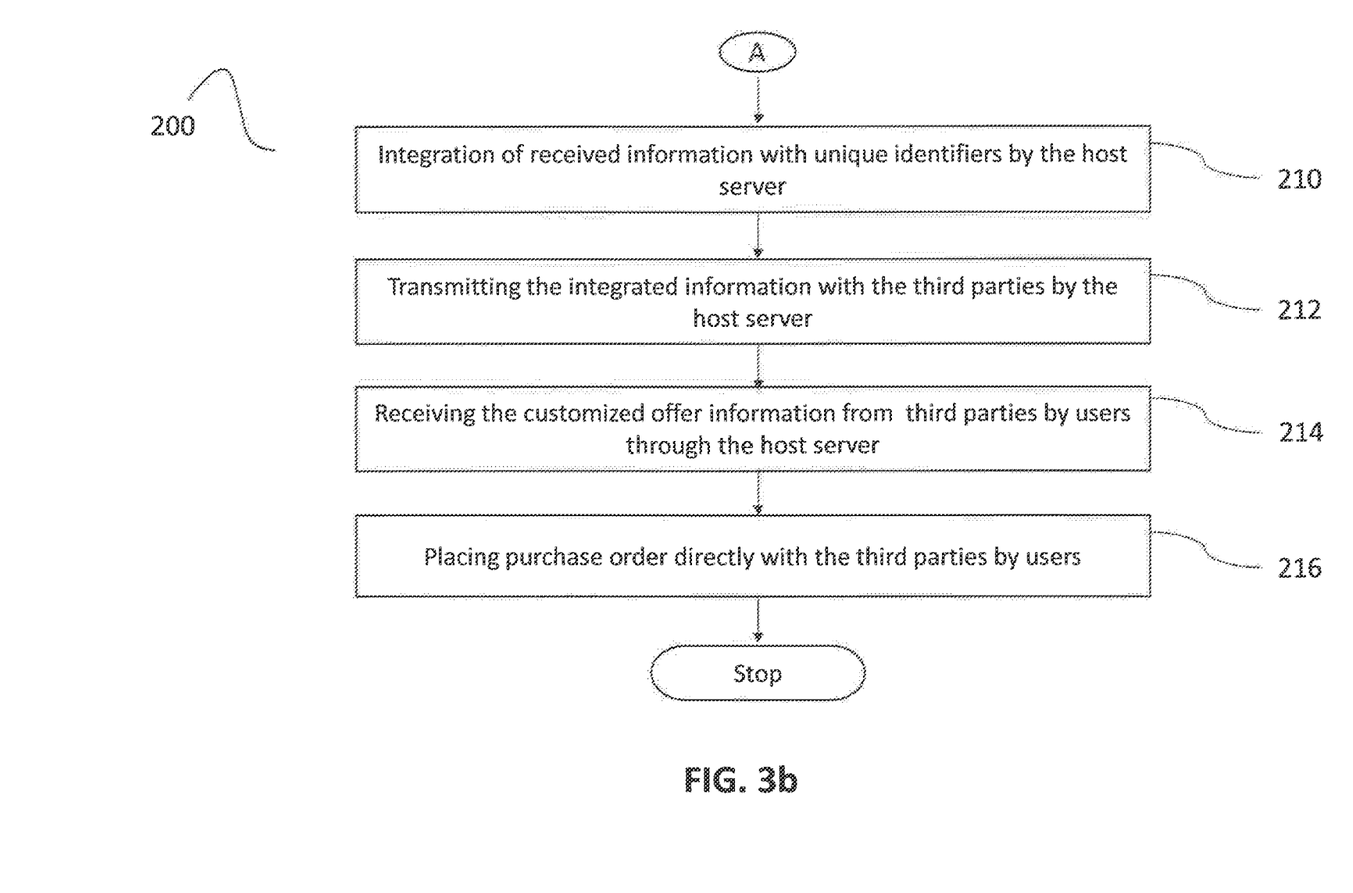

According to an illustrative embodiment of the invention, FIGS. 3a and 3b illustrates a method (200) for automatic replenishment and management of inventory. At step 202, the plurality of containers (102) determine(s) the residual level of the one or more household commodities. At step 204 the one or more communication boxes (104) receive the information of the residual level of the one or more household commodities from the plurality of containers (102). A number of containers (A1, A2, . . . An; B1, B2 . . . Bn; C1, C2 . . . Cn) of the plurality of containers (102), placed in an establishment, are in connection with identified communication box (X1, X2, . . . Xn) of the one or more communication boxes (104). At step (206) the one or more communication boxes (104) aggregate the received information of the residual level of the one or more household commodities. At step (208), the aggregated information by the one or more communication boxes (104) is shared with the host server (106). At step (210), the host server (106) integrates the received information from the one or more communication boxes (104) with one or more unique identifiers i,e. unique communication box identification, unique house number, and users' unique identification. Further, the host sever (106) aggregates and enhances the integrated information of the residual level of the one or more household commodities with user's location details and prepares an information list of the residual level of the one or more household commodities. At step (212), the host server (106) transmits the information list to the plurality of one or more third parties (108) over the internet. At step (214), the one or more third parties (108) prepare a customized offer information according to the received information list and share the customized offer information via the host server (106) to the users on their electronic devices (110). At step 216, the user may place orders directly with the one or more third parties (108) according to the customized offer information.

Although implementations of system and method for integrating data from plurality of sources and to present a comprehensive view to the consuming applications, it is to be understood that the specific features and methods are disclosed as examples of implementations for integrating data from plurality of sources and to present a comprehensive view to the consuming applications.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method for automatically maintaining an inventory of household commodity, the method comprising:
   determining a residual level of one or more household commodities present in a plurality of containers;
   transmitting an information of the residual level of the one or more household commodities present in the plurality of containers to a plurality of communication boxes, wherein the plurality of containers placed within an establishment are synched with at least one communication box of the plurality of communication boxes such that each container of the plurality of containers have their unique communication box identification;
   aggregating the received information of the residual level of the one or more household commodities by an aggregation module of a RetEx 2.0 Hub, wherein the aggregation module receives the information of the residual level from the plurality of communication boxes over the internet and stores in a table;
   integrating the received information of the residual level of the one or more household commodities with a plurality of unique identifiers to form integrated information by an integration module of the RetEx 2.0 Hub, wherein the plurality of unique identifiers include the unique communication box identification, a unique premises identification and a unique identification of an electronic device of a user, and wherein the plurality of unique identifiers are used for identifying the plurality of containers;
   enhancing the integrated information with location details of the user and prepare a list of the residual level of the one or more household commodities;
   providing the integrated information of the residual level of the one or more household commodities to one or more third parties in near real-time over the internet based on the location details of the user by a transmitting module of the RetEx 2.0 Hub, wherein the one or more third parties are registered with the RetEx 2.0 Hub and the one or more third parties' server is connected to the RetEx 2.0 Hub periodically;
   receiving a customized offer information over the internet at a receiver module of the RetEx 2.0 Hub associated with the integrated information provided with the one or more third parties by the RetEx 2.0 Hub;
   sharing the customized offer information with the user over the electronic device based on the unique identification of the electronic device of the user by the transmitting module of the RetEx 2.0 Hub; and
   placing a purchase order in the near real-time based on the customized offer information shared by RetEx 2.0 Hub directly with the one or more third parties by the user using the electronic device.

2. The method claimed in claim 1, the step of aggregating the information of the residual level of one or more household commodities from one or more communication boxes by the aggregation module of the RetEx 2.0 Hub.

3. The method claimed in claim 1, wherein the step of providing the integrated information of the residual level of the one or more household commodities along with the unique communication box identification and the unique premises identification to the one or more third parties by the transmitting module of the RetEx 2.0 Hub, the third parties include one or more vendors and one or more advertising agencies.

4. The method claimed in claim 1, wherein the step of sharing the customized offer information of the residual level of the one or more household commodities, the customized offer information includes special discounts, retail offers which can include one or more retail items with the commodities.

5. A system for automatically maintaining an inventory of one or more household commodities, the system comprising:
   a plurality of containers to store the one or more household commodities, wherein at least one sensor is attached to each of the plurality of containers to determine and transmit an information of residual level of the one or more household commodities in the plurality of containers to a plurality of communication boxes, wherein the plurality of containers placed within an establishment are synched with at least one communication box of the plurality of communication boxes such that each container of the plurality of containers have their unique communication box identification; and
   a RetEx 2.0 Hub, the RetEx 2.0 Hub further comprising:
   an aggregation module to aggregate the information of the residual level of he one or more household commodities, wherein the aggregation module receives the information of the residual level from the plurality of communication boxes over the internet and stores in a table;
   an integration module to integrate the aggregated information of the residual level of the one or more household commodities with a plurality of unique identifiers, wherein the plurality of unique identifiers include the unique communication box identification, a unique premises identification and a unique identification of an electronic device of a user, and wherein the plurality of unique identifiers are used for identifying the plurality of containers;
   the aggregation module to enhance the integrated information with location details of the user and prepare a list of the residual level of the one or more household commodities;
   a transmitting module to provide the integrated information of the residual level of the one or more household commodities to one or more third parties in near real-time over the internet based on the location details of the user, wherein the one or more third parties are registered with the RetEx 2.0 Hub and thereby one or more third parties' server is connected to the RetEx 2.0 Hub periodically;

a receiving module to receive customized offer information of the residual level of the one or more household commodities over the internet; and a transmitting module to share the customized offer information of the residual level of the one or more household commodities, based on integrated information shared by the RetEx 2.0 Hub, to an users' electronic device based on the unique identification of the electronic device of the user.

6. The system claimed in claim 5, wherein the plurality of containers are sensor enabled commodity containers for inventory.

7. The system claimed in claim 5, wherein the system further comprising one or more communication boxes, wherein the one or more communication boxes are configured to receive information of the residual level of the one or more household commodities from the plurality of containers and to report the received information to the RetEx 2.0 Hub.

8. The system claimed in claim 5, wherein the transmitting module of the RetEx 2.0 Hub provides the integrated information of the residual level of the one or more household commodities along with the unique communication box identification and the unique premises identification to the one or more third parties, the third party includes inventory vendors and advertising agencies.

9. The system claimed in claim 5, wherein the transmitting module of the RetEx 2.0 Hub transmit the customized offer information of the residual level of the one or more household commodities to the users' electronic device, the users' electronic device includes a mobile phone, an i-pod, or a laptop.

10. The system claimed in claim 5, wherein the customized offer information of the residual level of the one or more household commodities, the customized offer information includes special discounts in price and other retail offers like attaching other retail items with the one or more household commodities.

11. A non-transitory computer readable medium storing instructions for executing a method performed by a computer processor, the method comprising:

determining a residual level of one or more household commodities present in a plurality of containers;

transmitting an information of the residual level of the one or more household commodities present in the plurality of containers to a plurality of communication boxes, wherein the plurality of containers placed within an establishment are synched with at least one communication box of the plurality of communication boxes such that each container of the plurality of containers have their unique communication box identification;

aggregating the received information of the residual level of the one or more household commodities by an aggregation module of a RetEx 2.0 Hub, wherein the aggregation module receives the information of the residual level from the plurality of communication boxes over the internet and stores in a table;

integrating the received information of the residual level of the one or more household commodities with a plurality of unique identifiers to form integrated information by an integration module of the RetEx 2.0 Hub, wherein the plurality of unique identifiers include the unique communication box identification, a unique premises identification and a unique identification of an electronic device of a user, and wherein the plurality of unique identifiers are used for identifying the plurality of containers;

enhancing the integrated information with location details of the user and prepare a list of the residual level of the one or more household commodities;

providing the integrated information of the residual level of the one or more household commodities to one or more third parties in near real-time over the internet based on the location details of the user by a transmitting module of the RetEx 2.0 Hub, wherein the one or more third parties are registered with the RetEx 2.0 Hub and thereby one or more third parties' server is connected to the RetEx 2.0 Hub periodically;

receiving a customized offer information over the internet at a receiver module of the RetEx 2.0 Hub associated with the integrated information provided with the one or more third parties by the RetEx 2.0 Hub;

sharing the customized offer information with the user over the electronic device based on the unique identification of the electronic device of the user by the transmitting module of the RetEx 2.0 Hub; and placing a purchase order in the near real-time based on the customized offer information shared by RetEx 2.0 Hub directly with the one or more third parties by the user using the electronic device.

* * * * *